United States Patent
Filter et al.

(10) Patent No.: US 10,655,728 B2
(45) Date of Patent: May 19, 2020

(54) RECONFIGURABLE LUBRICATION SYSTEM FOR TILTROTOR TRANSMISSION

(71) Applicant: The Boeing Company, Chicago, IL (US)

(72) Inventors: Evan J. Filter, Doylestown, PA (US); Mark J. Robuck, Chadds Ford, PA (US)

(73) Assignee: The Boeing Company, Chicago, IL (US)

(*) Notice: Subject to any disclaimer, the term of this patent is extended or adjusted under 35 U.S.C. 154(b) by 1187 days.

(21) Appl. No.: 14/955,987

(22) Filed: Dec. 1, 2015

(65) Prior Publication Data

US 2017/0152935 A1 Jun. 1, 2017

(51) Int. Cl.
  *B64C 29/00* (2006.01)
  *F16H 57/04* (2010.01)
  *F16H 57/025* (2012.01)

(52) U.S. Cl.
  CPC ..... *F16H 57/0436* (2013.01); *B64C 29/0025* (2013.01); *B64C 29/0033* (2013.01); *F16H 57/025* (2013.01); *F16H 57/0402* (2013.01)

(58) Field of Classification Search
  CPC .............. B64C 29/0033; F16H 57/045; F16H 57/0404
  See application file for complete search history.

(56) References Cited

U.S. PATENT DOCUMENTS 2,778,316 A * 1/1957 Haight .................... F04C 14/04
  137/112
3,014,592 A * 12/1961 Stephens ............. F16H 57/0404
  210/167.08

(Continued)

FOREIGN PATENT DOCUMENTS

EP   2778063 A1   9/2014
EP   2837559 A1   2/2015

(Continued)

OTHER PUBLICATIONS

Wikipedia, "Pump"; https://en.wikipedia.org/wiki/Pump; archived by Internet Archive on Mar. 1, 2014; https://web.archive.org/web/20140301013931/https://en.wikipedia.org/wiki/Pump; accessed Apr. 22, 2019 (Year: 2014).*

(Continued)

*Primary Examiner* — Philip J Bonzell
(74) *Attorney, Agent, or Firm* — Miller, Matthias & Hull LLP

(57) ABSTRACT

Reversely identical transmissions for a tiltrotor aircraft include reconfigurable gearbox lubrication systems to accommodate operation in either direction of propeller rotation, using common parts. In a typical installation, at least two separate winged tiltrotor transmissions operate with opposing propeller rotations. Common parts of the two transmissions include cast housings, rotor shafts, pinion gears, lubrication sump tanks, lubrication pumps, and lubrication filter manifolds including filters having reversible orientations. Either transmission configuration can be utilized on either the left or right side of a tiltrotor aircraft by swapping the lubrication sump tank and lubrication filter manifold locations on the gearbox. In addition, a plug is used to manually reconfigure an opposite lubrication oil path to accommodate first and second rotational directions of the lubrication pump.

17 Claims, 6 Drawing Sheets

(56) References Cited

U.S. PATENT DOCUMENTS

| | | | | |
|---|---|---|---|---|
| 3,857,461 | A | * | 12/1974 | Schmitt ................ B62D 55/125 184/6.2 |
| 3,994,634 | A | * | 11/1976 | Riddle .................... F04C 14/04 418/32 |
| 4,040,505 | A | * | 8/1977 | Beveridge .............. B62D 55/13 184/6.28 |
| 5,054,716 | A | * | 10/1991 | Wilson ................ B64C 29/0033 244/56 |
| 5,823,470 | A | * | 10/1998 | Craig ................. B64C 29/0033 244/7 R |
| 8,517,670 | B1 | * | 8/2013 | Coffin .................... F01D 25/16 415/122.1 |
| 2003/0168863 | A1 | * | 9/2003 | Sandrart ................ B64C 27/12 290/55 |
| 2005/0115770 | A1 | | 6/2005 | Sandrart et al. |
| 2014/0001307 | A1 | | 1/2014 | Ehinger et al. |

FOREIGN PATENT DOCUMENTS

| | | |
|---|---|---|
| RU | 2160689 C2 | 12/2000 |
| WO | 2014133669 A1 | 9/2014 |

OTHER PUBLICATIONS

Wikipedia, "Gear Pump", https://en.wikipedia.org/wiki/Gear_pump; archived by Internet Archive on Nov 19, 2014; https://web.archive.org/web/20141119123338/https://en.wikipedia.org/wiki/Gear_pump; accessed Apr. 29, 2019 (Year: 2014).*

European Search Report related to Application No. 16190617.7-1757 dated Apr. 6, 2017.

Office Action for related Russian Application No. 2016136851/11(057854); report dated Jan. 24, 2020.

* cited by examiner

RECONFIGURABLE LUBRICATION SYSTEM FOR TILTROTOR TRANSMISSION

FIELD

The present disclosure relates generally to tiltrotor transmission oil lubrication systems, and more specifically to use of common parts employed in their manufacture to reduce part count and complexity.

BACKGROUND

Modern aircraft construction typically involves assembly of a voluminous number of parts and subassemblies. Efforts to minimize sheer numbers of parts are continuously being sought, as any reductions in physical numbers of parts translate directly into cost savings, as well as reduced complexity of structures involved.

In today's manufacturing environment, many of the subassemblies may be contracted to third parties for manufacture and subsequent installation into the overall aircraft structure. The simpler the subassembly, the simpler and less expensive will be overall costs of an aircraft.

Toward this end, efforts have been directed to maximizing interchangeability of parts in, for example, left and right side airframe devices, such as left-hand and right hand transmissions or gearboxes utilized in tilt rotor aircraft. Such interchangeability, for example, may permit one gearbox to be rotatable in a clockwise direction, while the other, using interchangeable or common parts, may be rotatable in a counterclockwise direction.

SUMMARY

In accordance with one aspect of the present disclosure, a gearbox for a tiltrotor aircraft includes housing, and a gear rotatably fixed within the housing. The gear is configured to rotate in opposite first and second directions. The housing contains a lubrication system having a reversely rotatable lubrication pump. Rotation of the gear is configured to control rotation of the pump in either the first or second direction of rotation.

In accordance with another aspect of the present disclosure, the lubrication system includes a filter manifold, and the housing has a first attachment interface and a second attachment interface. The filter manifold is configured to be coupled to the first attachment interface when the gear is rotating in the first direction, and the filter manifold is configured to be coupled to the second attachment interface when the gear is rotating in the second direction.

In accordance with another aspect of the present disclosure, the lubrication system includes a sump tank; and the housing includes a first attachment interface and a second attachment interface; and the sump tank is configured to be coupled to the second attachment interface when the gear is rotating in the first direction; and the sump tank is configured to be coupled to the first attachment interface when the gear is rotating in the second direction.

In accordance with another aspect of the present disclosure, the first and second attachment interfaces of the housing have identical footprints, and the gearbox is configured to have a vertical orientation, a horizontal orientation, and orientations between the vertical and horizontal orientations during operation on one wing of a tiltrotor aircraft. The gear is configured to rotate in a direction corresponding to that of a propeller on each wing of a tiltrotor aircraft having two wings, with each wing supporting a different direction of rotation of each propeller.

In accordance with another aspect of the present disclosure, the gearbox incorporates common parts irrespective of direction of rotation of the gear, the common parts including a cast housing, a rotor shaft, a pinion gear, an oil sump tank, and the filter manifold. The filter manifold contains a filter, and the filter can be used in either the first or second attachment interface upon rotation of the filter manifold 180° to accommodate a reversed oil flow direction, and the lubrication pump is a positive displacement pump rotatable in either the first or second directions of rotation.

In accordance with yet another aspect of the present disclosure, a method of making a gearbox for a tiltrotor aircraft includes the steps of: forming a housing having a gear rotatably fixed within housing, the gear being configured to rotate in opposite first and second directions of rotation; configuring a lubrication system within the housing, the lubrication system including a reversely rotatable pump such that the gear controls rotation of the pump in either the first or the second direction of rotation. The method may further include the step of configuring a first attachment interface and a second attachment interface on the housing, and forming the interfaces to have identical footprints.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated only schematically. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both apparatus and methods for carrying out the disclosure. Actual scope of the disclosure is as defined by the appended claims.

Figure 1:
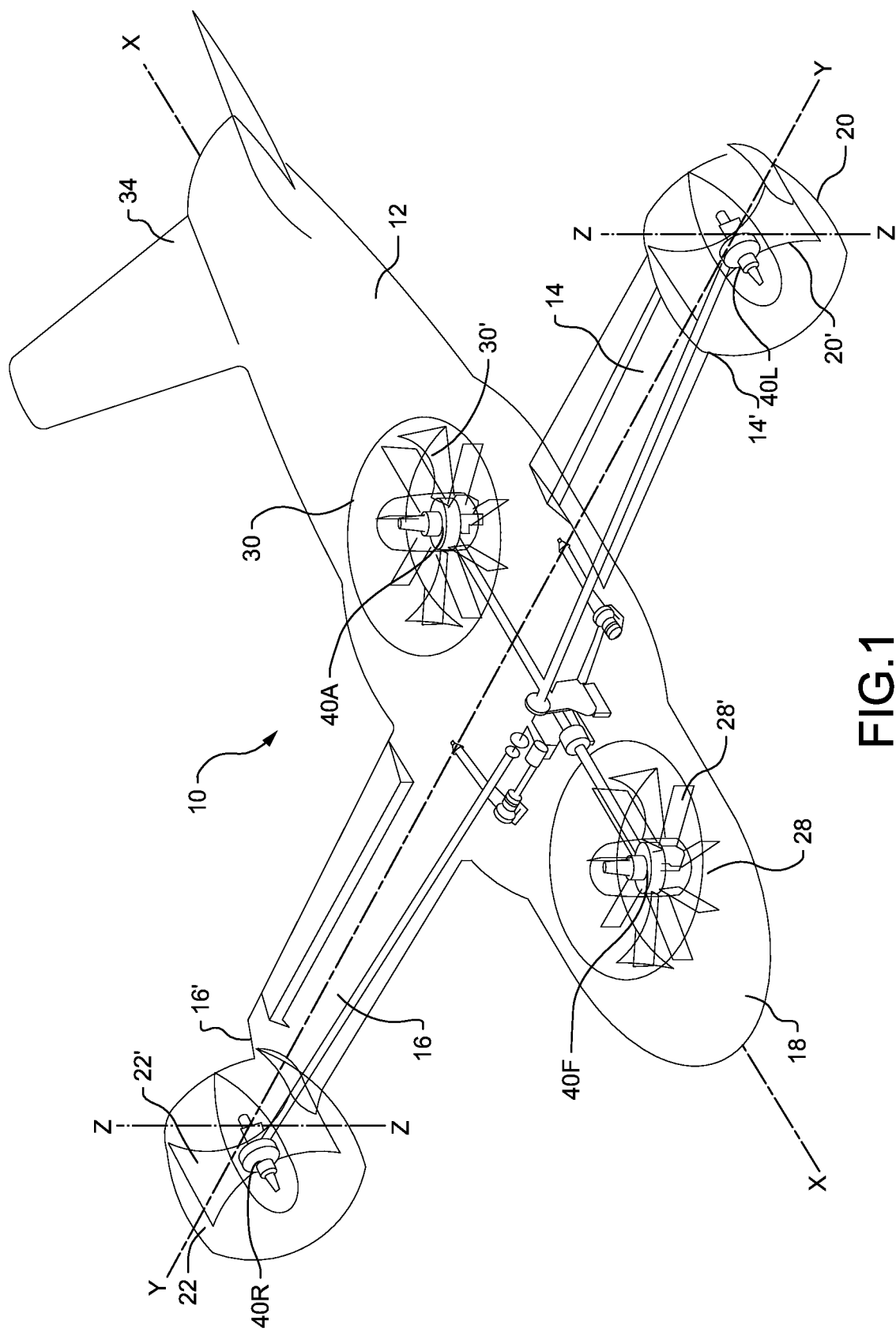
FIG. 1 is a perspective view of a tiltrotor aircraft having left and right side transmission or gearboxes constructed in accordance with the present disclosure.

In FIG. 1, a tiltrotor aircraft 10 is displayed; the aircraft 10 is constructed as an unmanned aerial vehicle, although the principles of this disclosure may apply generally to unmanned as well as manned aircraft. The tiltrotor aircraft 10 includes a fuselage 12 oriented along a fore and aft axis "x-x", as shown. The tiltrotor aircraft 10 includes a left wing 14 having a wingtip 14', and a right wing 16 having a wingtip 16'. The left and right wings 14, 16 are oriented along a lateral axis "y-y", which extends orthogonally to the "x-x" axis.

As depicted in FIG. 1, the tiltrotor aircraft 10 is in a forward flight mode. However, it will be appreciated that the tiltrotor aircraft 10 is a flying machine that includes a hovering capability, as would be typical of a helicopter, in addition to conducting straight forward flight as a basic airplane. For transitioning between its hovering and flight modes, the aircraft 10 includes a left wing engine assembly 20, having a propeller 20', and a right-wing engine assembly 22, having a propeller 22', each of which engine assemblies 20, 22 are capable of being rotated between horizontal (as shown) and vertical orientations, including any orientation in between, depending on desired performance and mode. In the hovering mode, the engine assemblies 20, 22 are oriented vertically (as shown only in FIGS. 2 and 3) such that their propellers 20', 22' are oriented upwardly along an axis "z-z" (FIG. 1), orthogonal to each of the described axes, "x-x" and "y-y".

For purposes of hovering, engine assemblies 28 and 30 housed within the fuselage 12 can become operational. The engine assembly 28 is situated in a forward portion of the fuselage 12 along the axis x-x, as shown, and includes a propeller 28' permanently oriented along the z-z axis. The engine assembly 30, on the other hand, is situated in a rear portion of the fuselage 12, also along the axis x-x, and includes a propeller 30' that is also permanently oriented along the z-z axis. As situated, the forward engine assembly 28 is near the nose 18 of the aircraft 10, as shown, while the rear engine assembly 30 is just forward of the tail portion, or empennage 34, of the aircraft 10.

Figure 2:
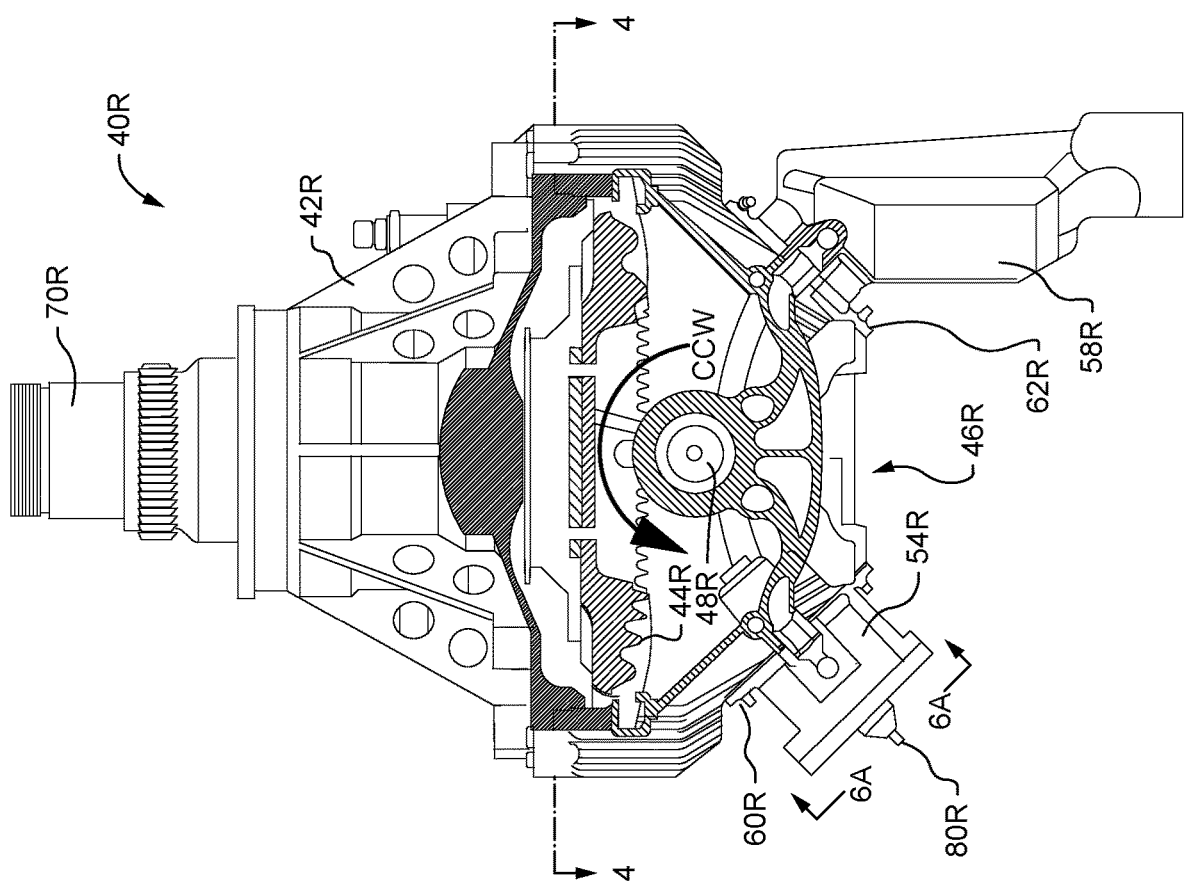
FIG. 2 is a view of the left side transmission or gearbox of FIG. 1.

Referring now also to FIG. 2, a transmission 40R is depicted; the transmission is associated with the right-wing engine assembly 22. The transmission 40R, which may be also referred to as a gearbox is one of four transmissions depicted in FIG. 1, the others being transmission 40L, associated with the left wing engine assembly 20; transmission 40F, associated with the front fuselage engine assembly 28; and transmission 40A, associated with the aft fuselage engine assembly 30, as described above.

Transmission 40R includes a housing 42R, which may be cast as shown, and which may incorporate a main gear 44R driven by a pinion input gear 48R. In the view of FIG. 2, the transmission 40R is shown in its vertical or hovering orientation, and the pinion input gear 48R is oriented along the axis y-y of FIG. 1 (although the pinion gear 48R is only visible in FIG. 2). The transmission 40R includes a lubrication system 46R, as do the other transmissions 40, as will be appreciated by those skilled in the art.

Figure 3:
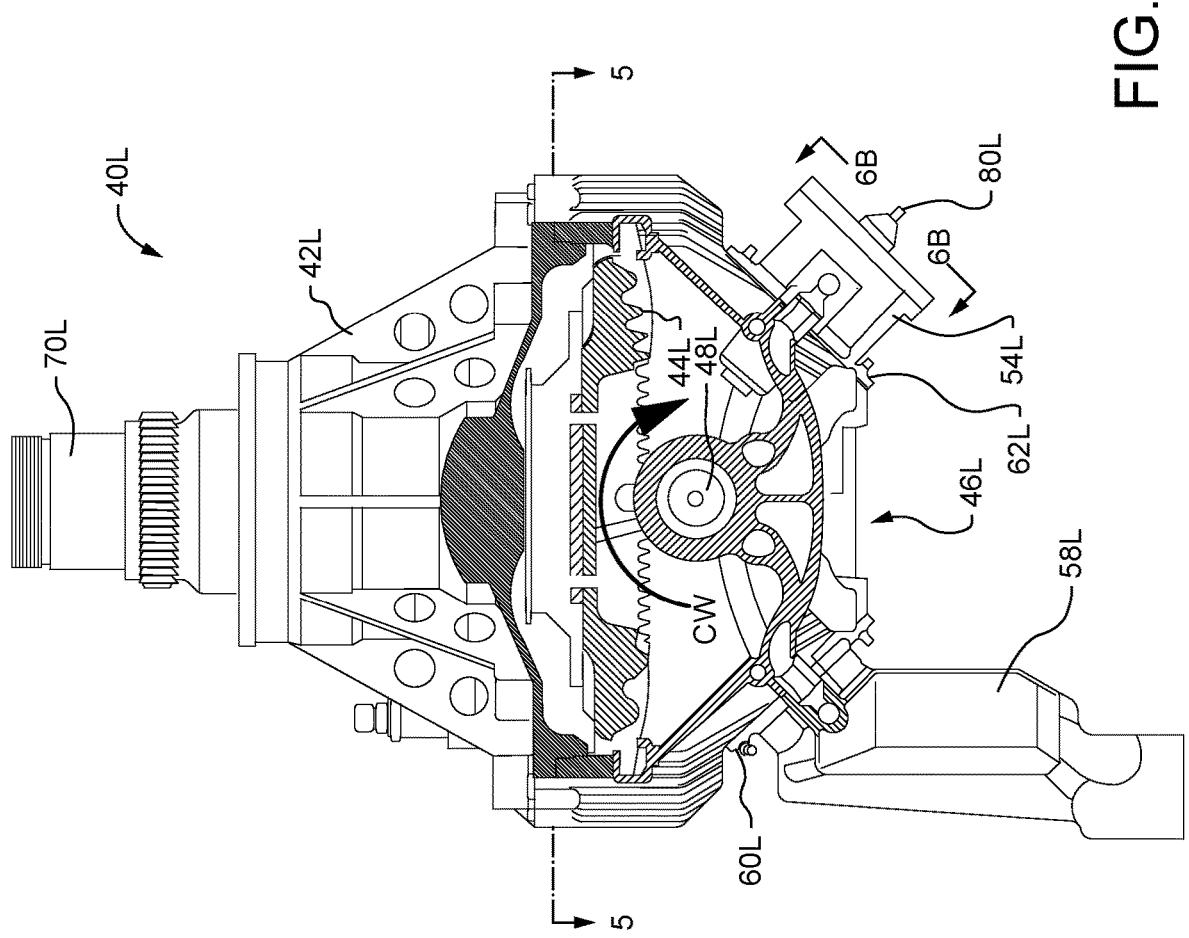
FIG. 3 is a view of the right side transmission or gearbox of FIG. 1.

Referring now also to FIG. 3, the transmission 40L is depicted as being reversely similar to the transmission 40R of FIG. 2, as described. In the transmission 40L, a similar housing 42L also incorporates a main gear 44L, driven by a pinion input gear 48L. Again, in the view of FIG. 3, the transmission 40L is shown in its vertical or hovering orientation, and the pinion input gear 48L is also oriented along the axis y-y of FIG. 1 (although the pinion gear 48L is only visible in FIG. 3). Similarly, the transmission 40L includes a lubrication system 46L.

The configurations of the two transmissions 40R and 40L are such that common parts may be used between them, in a manner to be described. It should be noted that interior lubrication oil paths (66R and 66L of FIGS. 4 and 5) of the lubrication systems 46R and 46L are configured to move in opposite directions, to the extent that the pinion gear 48R of the transmission 40R is configured to rotate counterclockwise, in the view of FIG. 2 as shown, while the pinion gear 48L is configured to rotate clockwise in the corresponding view of FIG. 3. In both FIGS. 2 and 3, vertically oriented rotor shafts 70R and 70L are shown, each of which is configured to have a propeller 22' and 20', respectively, secured thereto.

Figure 4:
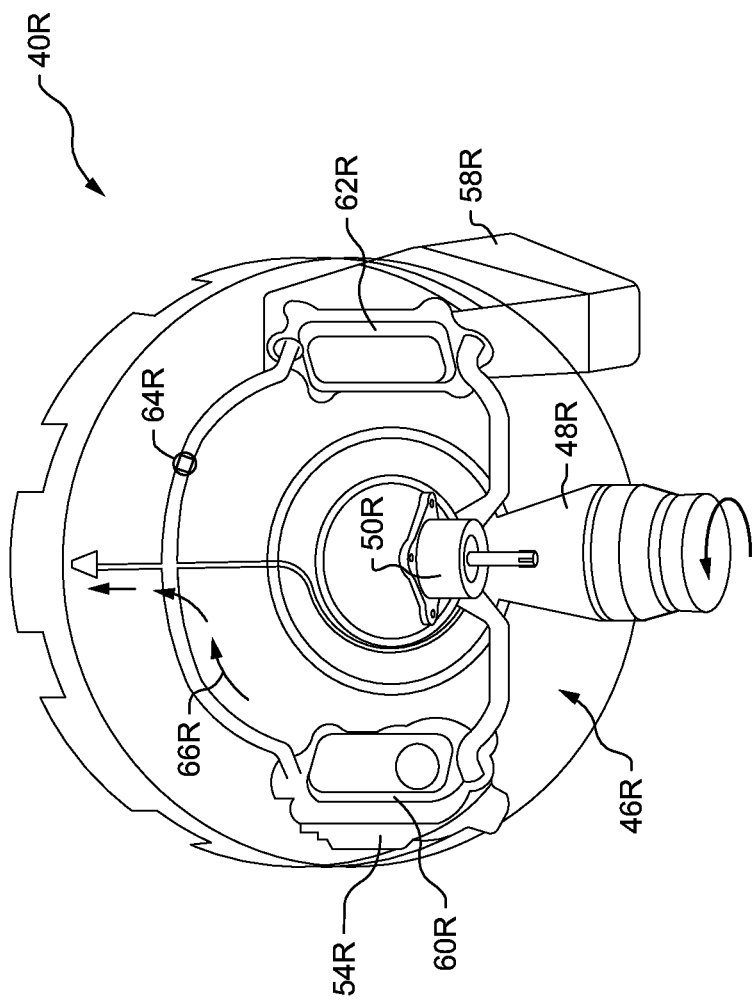
FIG. 4 is a cross-sectional schematic depiction of the left side transmission or gearbox of FIG. 2, as viewed along lines 4-4, thereof.
Figure 5:
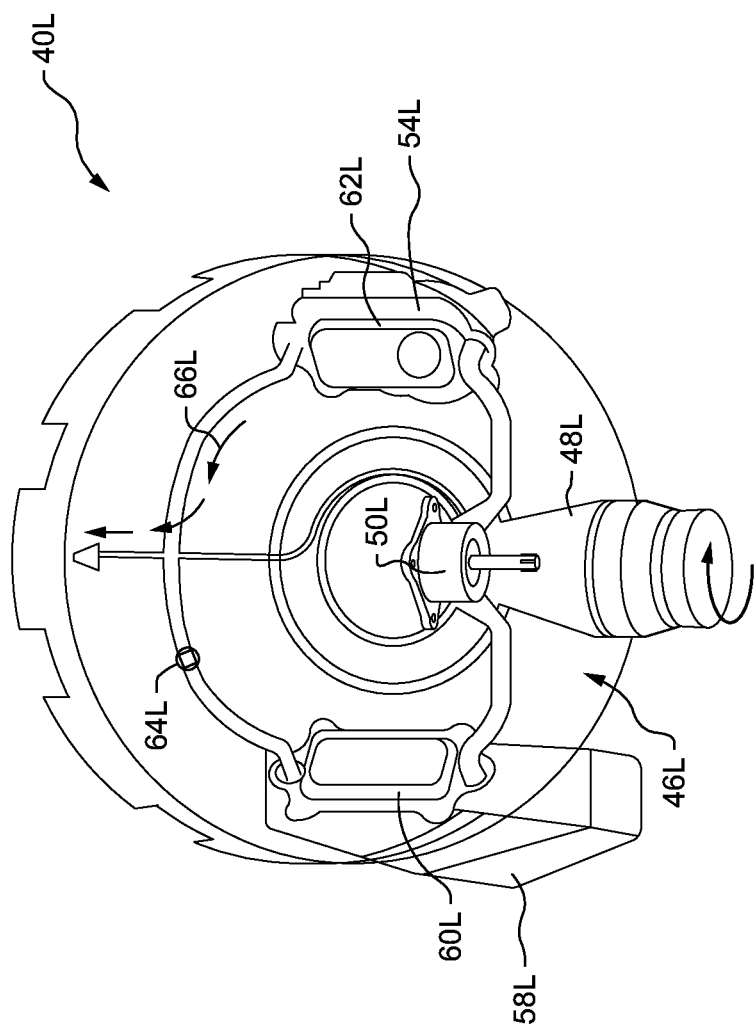
FIG. 5 is a cross-sectional schematic depiction of the right side transmission or gearbox of FIG. 3, as viewed along lines 5-5, thereof.

Referring now to FIGS. 4 and 5, it will be apparent that the pinion gear 48R of FIG. 4 drives a reversely rotatable oil pump 50R, while the pinion gear 48L of FIG. 5 drives a reversely rotatable oil pump 50L. As noted, the flow path of the lubrication oil in FIG. 4 is clockwise, indicated by the arrows 66R. Thus, in the configuration of the transmission 40R of FIG. 4, the pump 50R pulls the oil from a sump tank 58R (on the right side in the view of FIG. 4), and moves it through an oil filter 68R (visible only in view of FIG. 6A) in a filter manifold 54R, before distributing it in a clockwise direction to lubrication jets (indicated by the vertical arrow). Conversely, in the configuration of the transmission 40L of FIG. 5, the pump 50L pulls the oil from a sump tank 58L (on the left side in the view of FIG. 5), and moves it through a filter 68L (FIG. 6B) and a filter manifold 54L, before distributing it in a counterclockwise direction (arrows 66L), and ultimately to lubrication jets (vertical arrow).

The filter manifolds 54R and 54L, as well as the sump tanks 58R and 58L can be readily interchanged to permit the configuring of a transmission 40R and 40L for use on either the right or left wings 16, 14 of the tiltrotor aircraft 10. For this purpose, the respective transmissions 40R and 40L each have a first attachment interface 60R and 60L, and a second attachment interface 62R and 62L. The attachment interfaces 60 and 62 are essentially mounting pads for the respective filter manifolds 54R and 54L, and sump tanks 58R and 58L, that have virtually identical footprints, even including similar patterns of bolt-holes 74R and 74L (FIGS. 6A and 6B), and thus may be entirely interchangeable. As such, to configure a left-wing transmission 40L, in lieu of a right-wing transmission 40R, the filter manifold 54 and respective sump tank 58 can be positionally swapped. Continuing reference to FIGS. 4 and 5, plugs 64R and 64L are also installed within the lubrication systems 46R and 46L, respectively, to prevent oil flow through either undesired portion of the oil flow path 66R or 66L, since each lubrication system 46R, 46L has an opposite direction of rotation, as will be appreciated by those skilled in the art.

Figure 6A:
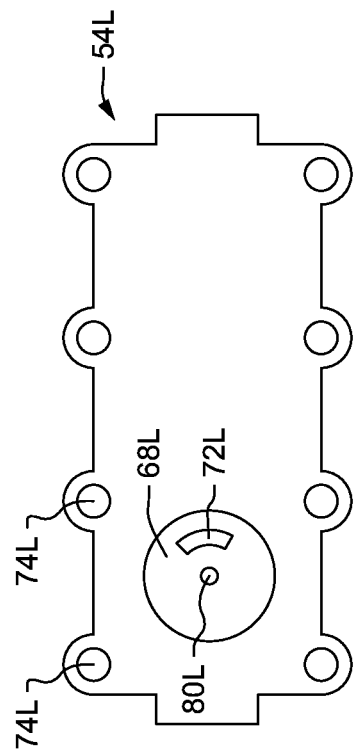
FIG. 6A is a view along lines 6A-6A of FIG. 2.
Figure 6B:
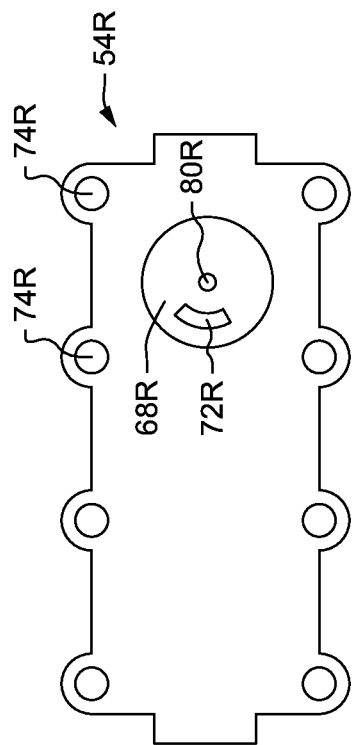
FIG. 6B is a view along lines 6B-6B of FIG. 3.

Referring now to FIGS. 6A and 6B, respective oil filters 68R and 68L may be secured in place within respective oil filter manifolds 54R and 54L via securement means 80R and 80L to respective housings 42R and 42L. Since the transmissions 40R and 40L have opposite side lubrication flow paths, the filters 68R, 68L may be slightly offset as shown on the manifolds, so as to be seamlessly interchangeable by simply reversing orientation of the filter manifold, i.e. by turning same 180°, to accommodate desired oil flow direction. Such oil flow directions 66R and 66L (FIGS. 4 and 5) are consistent with respective positions of filter indicators 72R and 72L on filters 68R and 68L situated in the oil filter manifolds 54R and 54L. The manifolds are secured to their respective attachment interfaces 60R and 62L (FIGS. 2 and 3) on opposite sides of transmissions 40R and 40L. Reversing orientations of the oil filter manifolds 54R and 54L is herein defined as a 180° change in each of their respective orientations to accommodate their securement via bolt holes 74R and 74L (FIGS. 6A and 6B) to opposite sides of their respective housings 42R and 42L.

In the described structures of the transmissions 40R and 40L, common parts would at least include the cast housing 42R, 42L, the rotor shafts 70R, 70L, the pinion gears 48R, 48L, the oil sump tanks 58R, 58L, oil pumps 50R, 50L, filters 68R, 68L, and the filter manifold 54R, 54L, along with numerous other parts, including bearings and seals, not shown. For example, assuming straight bevel gears are used in pumping oil, the main gears 44R, 44L, and the pinion input gears 48R, 48L may be common to both transmissions 40R, 40L. If, on the other hand, the gears are spiral bevel gears, then above-described common parts could be utilized except for unique left-hand and right-hand gear sets to accommodate the latter.

Based on the foregoing, those skilled in the art will appreciate that the term "common" as used throughout refers to interchangeability of above-described parts of the transmissions 40R and 40L. As such, among the various aspects described herein, the filter manifolds 54R and 54L, and the sump tanks 58R and 58L may, respectively, be mounted on either of the pads 60 and 62, depending on desired direction of pump rotation and resulting flow path 66R or 66L.

A method of making a gearbox for a tiltrotor aircraft may include the steps of: forming a housing having a gear rotatably fixed within the housing, the gear being configured to rotate in opposite first and second directions of rotation; configuring a lubrication system within the housing, the lubrication system including a reversely rotatable pump such that rotation of the gear controls rotation of the pump in either the first or the second direction of rotation. The method may further include the step of configuring a first attachment interface and a second attachment interface on the housing, and forming the interfaces to have identical footprints.

The disclosed transmissions/gearboxes 40R and 40L may have other variations and alternative constructions neither described nor suggested herein. For example, although described only in terms of use with or in a tiltrotor aircraft, other configurations and components of transmissions/gearboxes may be utilized in other types of aircraft, and potentially in other environments. Moreover, although the components described may have been formed only in shapes and sizes depicted, numerous variations of the disclosed structures may be envisioned for use in constructing alternative embodiments of aircraft 10 and transmissions 40, as may be appreciated by those skilled in the art.

What is claimed is:

1. A gearbox for a tiltrotor aircraft, the gearbox comprising:
   a housing;
   the housing including a gear rotatably supported within the housing, the gear being configured to rotate in opposite first and second directions of rotation;
   the housing further including a lubrication system, the lubrication system having a reversely rotatable lubrication pump; wherein the rotation of the gear controls rotation of the pump in either the first or the second direction of rotation;
   wherein the lubrication system includes a filter manifold, and the housing includes a first attachment interface and a second attachment interface; and wherein the filter manifold is configured to be coupled to the first attachment interface when the gear is rotating in the first direction, and wherein the filter manifold is configured to be coupled to the second attachment interface when the gear is rotating in the second direction; wherein the gearbox lubrication system is reconfigurable for accommodating propeller rotation in either direction.

2. The gearbox of claim 1, wherein the first attachment interface and the second attachment interface have identical footprints.

3. The gearbox of claim 1, being configured to have a vertical orientation, a horizontal orientation, and orientations between the vertical and horizontal orientations during operation on a first wing of the tiltrotor aircraft.

4. The gearbox of claim 1, wherein the lubrication system includes a sump tank; and wherein the sump tank is configured to be coupled to the second attachment interface when the gear is rotating in the first direction; and wherein the sump tank is configured to be coupled to the first attachment interface when the gear is rotating in the second direction.

5. The gearbox of claim 4, wherein the gear rotates in a direction corresponding to that of a first propeller on a first wing of the tiltrotor aircraft, the tiltrotor aircraft having first and second wings, the second wing having a second propeller, wherein each of the first wing and the second wing supports a different direction of rotation of each respective propeller.

6. The gearbox of claim 4, wherein the filter manifold contains a filter, and wherein the filter is usable in either the first or second attachment interface upon a reverse orientation of the filter manifold to accommodate an oil flow direction within the gearbox.

7. The gearbox of claim 4, wherein the lubrication pump is a positive displacement pump rotatable in either the first or second direction of rotation.

8. A tiltrotor aircraft having a left propeller on a left wing thereof, a right propeller on a right wing thereof, and a pair of oppositely rotating transmissions, each transmission respectively affixed to one propeller; the tiltrotor aircraft comprising:
   each transmission including a lubrication system including a lubrication pump, a lubrication sump tank, and a filter manifold; wherein rotation of the lubrication pump is reversibly reconfigurable by switching positions of the lubrication sump tank and filter manifold to either the left or right wing in either of a first and a second direction of propeller rotation;
   wherein rotation of the lubrication pump in the first or the second direction of propeller rotation is accommodated by reversing positions of the lubrication sump tank and the filter manifold on the transmission; and
   wherein a filter is configured to be affixed to the filter manifold of each transmission, each filter being defined by a flat, circular body including a filter manifold orientation indicator to display orientation of the filter manifold on each of the pair of transmissions.

9. The tiltrotor aircraft of claim 8, wherein each transmission is configured to have a vertical orientation, a horizontal orientation, and orientations between the vertical and horizontal orientations.

10. The tiltrotor aircraft of claim 8, wherein each transmission comprises common parts irrespective of rotation of the lubrication pump of that transmission, wherein the common parts include a cast housing, a rotor shaft, a pinion gear, the oil sump tank, the filter, and the filter manifold.

11. The tiltrotor aircraft of claim 8, wherein each lubrication pump of each respective transmission is a positive displacement pump rotatable in either of the first or second directions of propeller rotation.

12. The tiltrotor aircraft of claim 8, wherein each transmission further comprising a rotatable gear, wherein one of the lubrication pumps interfaces with the rotatable gear of the one transmission for inducing rotation of the one lubrication pump, wherein the one transmission includes a first attachment interface and a second attachment interface; and wherein one of the filter manifolds is coupled to the first attachment interface of the one transmission when the gear is rotating in the first direction, and wherein the other of the filter manifolds is coupled to the second attachment interface of the one transmission when the rotatable gear of the one transmission is rotating in the second direction.

13. The tiltrotor aircraft of claim 12, wherein one sump tank is coupled to the second attachment interface of the one transmission when the gear of the one transmission is rotating in the first direction; and wherein the other sump tank is coupled to the first attachment interface of the one transmission when the gear is rotating in the second direction.

14. The tiltrotor aircraft of claim 12, wherein each of the first attachment interface and the second attachment interface have identical footprints.

15. The tiltrotor aircraft of claim 12, wherein each filter is used on either of the first or second attachment interface by a reverse orientation of the filter manifold to accommodate an oil flow direction within the transmission.

16. A method of making a gearbox for a tiltrotor aircraft, the method including the steps of:
   forming a pair of housings, each having a lubrication system and a gear rotatably supported within each housing, each gear being configured to rotate in opposite first and second directions of rotation;
   configuring each lubrication system within each housing to include a reversely rotatable pump and a filter manifold attachable respectively to each housing, each filter manifold having a reversible orientation on each respective housing; wherein the rotation of each gear controls rotation of the pump in either the first or the second direction of rotation;
   wherein the lubrication system includes a filter manifold, and the housing includes a first attachment interface and a second attachment interface; and wherein the filter manifold is configured to be coupled to the first attachment interface when the gear is rotating in the first direction, and wherein the filter manifold is configured to be coupled to the second attachment interface when the gear is rotating in the second direction; wherein the gearbox lubrication system is reconfigurable for accommodating propeller rotation in either direction.

17. The method of claim 16, further comprising the step of providing the first attachment interface and the second attachment interface on each housing, and forming the interfaces to have identical footprints.

* * * * *